(12) United States Patent
Kenna, III et al.

(10) Patent No.: US 8,826,168 B2
(45) Date of Patent: Sep. 2, 2014

(54) SECURE ELECTRONIC MEDIA DISTRIBUTION AND PRESENTATION SYSTEM

(75) Inventors: Frank Kenna, III, Branford, CT (US); Richard George Pierce, Monroe, CT (US)

(73) Assignee: The Marlin Company, North Haven, CT (US)

( * ) Notice: Subject to any disclaimer, the term of this patent is extended or adjusted under 35 U.S.C. 154(b) by 384 days.

(21) Appl. No.: 12/723,744

(22) Filed: Mar. 15, 2010

(65) Prior Publication Data
US 2010/0175017 A1     Jul. 8, 2010

Related U.S. Application Data

(63) Continuation of application No. 11/541,160, filed on Sep. 29, 2006, now Pat. No. 7,743,112, which is a continuation-in-part of application No. 11/050,093, filed on Feb. 3, 2005, now Pat. No. 7,765,273, which is a continuation of application No. 09/758,833, filed on Jan. 11, 2001, now abandoned.

(51) Int. Cl.
*G06F 3/048* (2013.01)

(52) U.S. Cl.
USPC .......................................... 715/774; 709/217

(58) Field of Classification Search
USPC ......... 709/206, 217, 219, 223, 229; 705/7.11, 705/14.52, 14.68; 370/429; 348/207.1, 348/211.1, 552; 235/375, 462.01; 715/205, 715/764, 774; 726/26
See application file for complete search history.

(56) References Cited

U.S. PATENT DOCUMENTS

| | | | |
|---|---|---|---|
| 5,621,874 A * | 4/1997 | Lucas et al. .................... | 715/205 |
| 5,625,818 A | 4/1997 | Zarmer et al. | |
| 5,872,589 A | 2/1999 | Morales | |
| 5,889,896 A | 3/1999 | Meshinsky et al. | |
| 5,946,414 A | 8/1999 | Cass et al. | |
| 5,956,486 A * | 9/1999 | Hickman et al. .............. | 709/206 |
| 5,970,231 A | 10/1999 | Crandall | |
| 6,073,119 A | 6/2000 | Bornemisza-Wahr et al. | |
| 6,081,788 A | 6/2000 | Appleman et al. | |
| 6,118,449 A | 9/2000 | Rosen et al. | |
| 6,125,388 A | 9/2000 | Reisman | |
| 6,223,027 B1 | 4/2001 | Ono et al. | |
| 6,275,854 B1 | 8/2001 | Himmel et al. | |
| 6,314,448 B1 | 11/2001 | Conner et al. | |
| 6,317,761 B1 | 11/2001 | Landsman et al. | |
| 6,321,256 B1 | 11/2001 | Himmel et al. | |
| 6,324,553 B1 | 11/2001 | Cragun et al. | |

(Continued)

OTHER PUBLICATIONS

Whalley, et al.; "Two Examples of the use of 'Electronic Posters'"; Journal of Geography in Higher Education; Oxford; Nov. 1998; vol. 22; Iss 3, p. 416, 5 pages.

*Primary Examiner* — Andrew Joseph Rudy
(74) *Attorney, Agent, or Firm* — Cantor Colburn LLP (57) ABSTRACT

A method and apparatus for the distribution of electronic media content for distribution to employees of a subscriber. The system includes an electronic display for displaying selected electronic media content that may be selected, modified and/or generated by the subscriber. The system allows for dramatically increased subscriber control of the media content presented as well as for increased security for any confidential media content to be presented on the customer display. The system further provides for individual control of multiple displays that may be located in differing geographic locations while at the same time providing for ease of information management.

20 Claims, 6 Drawing Sheets

(56) References Cited

U.S. PATENT DOCUMENTS

| | | |
|---|---|---|
| 6,385,592 B1 | 5/2002 | Angles et al. |
| 6,415,291 B2 | 7/2002 | Bouve et al. |
| 6,438,588 B1 | 8/2002 | Crandall |
| 6,446,045 B1 * | 9/2002 | Stone et al. ............... 705/26.1 |
| 6,462,654 B1 | 10/2002 | Sandelman et al. |
| 6,477,575 B1 | 11/2002 | Koeppel et al. |
| 6,519,584 B1 | 2/2003 | Tognazzini et al. |
| 6,519,651 B1 | 2/2003 | Dillon |
| 6,535,123 B2 | 3/2003 | Sandelman et al. |
| 6,577,329 B1 * | 6/2003 | Flickner et al. ............... 715/774 |
| 6,591,247 B2 | 7/2003 | Stern |
| 6,701,143 B1 | 3/2004 | Dukach et al. |
| 6,721,713 B1 | 4/2004 | Guheen et al. |
| 6,721,872 B1 * | 4/2004 | Dunlop et al. ............... 712/28 |
| 6,721,955 B2 | 4/2004 | Khoo et al. |
| 6,725,203 B1 | 4/2004 | Seet et al. |
| 6,829,587 B2 * | 12/2004 | Stone et al. ............... 705/26.8 |
| 6,957,186 B1 | 10/2005 | Guheen et al. |
| 6,995,789 B2 | 2/2006 | McIntyre et al. |
| 6,999,111 B2 | 2/2006 | McIntyre et al. |
| 7,050,654 B2 | 5/2006 | Lunetta et al. |
| 7,050,989 B1 | 5/2006 | Hurt et al. |
| 7,062,454 B1 | 6/2006 | Giannini et al. |
| 7,069,271 B1 | 6/2006 | Fadel et al. |
| 7,130,807 B1 | 10/2006 | Mikurak |
| 7,130,841 B1 | 10/2006 | Goel et al. |
| 7,149,698 B2 | 12/2006 | Guheen et al. |
| 7,155,663 B2 | 12/2006 | Landsman et al. |
| 7,206,748 B1 | 4/2007 | Gruse et al. |
| 7,229,021 B2 * | 6/2007 | Vesikivi et al. ............ 235/462.01 |
| 7,240,025 B2 | 7/2007 | Stone et al. |
| 7,243,153 B2 | 7/2007 | McIntyre et al. |
| 7,277,870 B2 | 10/2007 | Mourad et al. |
| 7,313,622 B2 | 12/2007 | Lee et al. |
| 7,353,541 B1 | 4/2008 | Ishibashi et al. |
| 7,366,159 B1 * | 4/2008 | Parlamas et al. ............ 370/352 |
| 7,398,318 B2 | 7/2008 | McIntyre |
| 7,451,467 B2 | 11/2008 | Carver et al. |
| 7,578,443 B1 | 8/2009 | Harris |
| 7,734,475 B2 | 6/2010 | Allan et al. |
| 8,073,711 B1 | 12/2011 | McCollum et al. |
| 8,645,856 B1 * | 2/2014 | Burr et al. ............... 715/774 |

* cited by examiner

SECURE ELECTRONIC MEDIA DISTRIBUTION AND PRESENTATION SYSTEM

CROSS-REFERENCE TO RELATED APPLICATIONS

This application is a continuation of U.S. patent application Ser. No. 11/541,160 filed on Sep. 29, 2006 now U.S. Pat. No. 7,743,112, which is a continuation-in-part of U.S. patent application Ser. No. 11/050,093 filed on Feb. 3, 2005 now U.S. Pat. No. 7,765,273, which is a continuation of U.S. patent application Ser. No. 09/758,833 filed on Jan. 11, 2001 now abandoned.

FIELD OF THE INVENTION

The present invention relates generally to employee communication programs, and, more particularly, to a method and apparatus for publishing and distributing employee communications.

BACKGROUND OF THE INVENTION

Modern business management calls for effective communications between management and employees. Among various other techniques for communicating with employees, conventional employee communication programs have typically included providing a bulletin board upon which printed material, such as for example, posters including photographs, artwork, designs and/or slogans, and messages are displayed. Topics that may be the subject of employee communications are diverse and may involve safety, work quality, teamwork, morale and self-motivation. For example, since safety is an important consideration in most working environments, a poster with a slogan relating to the exercise of caution in potentially dangerous situations may be displayed for impressing upon employees an employer's requirement for observing on-the-job safety. Other examples of representative employee communications include news releases about the company, messages for boosting employee morale and/or messages relating to employee activities.

In conventional systems, graphic designers may develop posters and other employee communications by hand or on a computer aided design system. Typically, they are printed as a large employee communication for display and then sent to a client for mounting to a bulletin board. The bulletin board may be relatively sophisticated and creatively organized for efficiency and visual attention, such as a three-panel bulletin board on the order of 26 inches (66 centimeters) by 63 inches (160 centimeters). The posters are typically manually replaced to communicate corporate goals, news of interest and employee activities to employees.

At regular time intervals, such as once a month or once a week, clients may select new posters and messages and/or the new posters and messages are automatically selected, printed and shipped periodically to each client. Because of the large number and variety of clients and the specific requirements for certain users, there are significant inefficiencies associated with selecting, printing and shipping the employee communications. This is especially so where various bulletin boards located throughout a company's various facilities require different material to be posted on differing bulletin boards.

In addition, achieving a relatively high degree of customization and selectivity with traditional manual bulletin board systems is economically problematic.

Accordingly, it is desired to provide an efficient system that overcomes many of the deficiencies of prior art systems and services.

SUMMARY OF THE INVENTION

Briefly stated, the invention in a preferred form replaces the display of printed employee communications with a method and apparatus for distribution of electronic media. In one embodiment of the invention, electronic media replaces the physical posters and printed materials and the conventional bulletin board is replaced by an electronic display. Maintaining the employee communications in electronic form from creation to display significantly reduces costs, while at the same time, dramatically improves the flexibility of an employee communications program.

One advantageous embodiment may include an electronic communication display system transmitting media data to one or more remote client locations where the media is displayed, e.g. to employees. The electronic communication display system in this particular embodiment comprises an electronic display for displaying media, and a client computer that receives data corresponding to the media for display. A web server capable of communicating with the client computer for transmission of data thereto is also provided. The web server along with an application server, which may comprise one or more machines, communicating with the web server formulates the data for ultimate transmission to the client computer.

It is envisioned that a service provider of the workplace communications may maintain the web server and applications server. The provider may also design and store certain electronic employee communications suitable for a variety of business types, e.g., manufacturing, sales, service, etc. The electronic employee communications may be provided to businesses as, for example, a subscription service. A subscriber may be provided with the electronic display and client computer for display of electronic employee communications produced by the provider. Alternatively, the subscriber may utilize existing compatible equipment for receipt and display of the media. The subscriber provides information about his business to the provider to aid the provider's software in producing pertinent electronic employee communications. The subscriber is granted limited access to the provider's application server to enable the subscriber to choose, alter and/or generate new custom electronic employee communications, which are to be delivered to the subscriber's electronic display.

In one advantageous embodiment, a system is provided that allows for selection of pre-assembled media content, customization of the pre-assembled media content by the subscriber or generation of new media content by the subscriber. In this manner, the subscriber has full control over the media content supplied to the subscriber's employees. It is contemplated that the subscriber may categorize particular media content into collections, e.g. certain media content is be selected to be played on a display for maintenance personnel while other selected media content may be selected to be played on a display for management personnel. It is still further contemplated that the various collections may be linked to certain groups, e.g. it is determined that while the various maintenance personnel at the subscribers various complexes may not be presented with an identical presentation, there are particular media collections that will be displayed at all maintenance displays.

It is further contemplated that the subscriber may generate custom media content for display to its employees, whether by alteration of the pre-assembled media content or generation of entirely new media content. In some instances, the subscriber may not want confidential employee communications to be accessible to individuals outside of the subscriber's company. Accordingly, provision is made for confidential media information to remain or be stored on the subscriber's system. When the run program for the display advances to the point of displaying the confidential media information, rather than pulling this information from the service provider server, the system is directed to the customer's system to retrieve the confidential information.

In another embodiment, it is still contemplated that full customization of the media presentation may be provided to the subscriber, including, for example, the ability to adjust the content and sequence of the media information displayed and the length of time each piece of media is played on the display. In another advantageous embodiment, multi-language capability is further provided to the subscriber to be selected as desired.

In one configuration, the electronic communication display system may comprise two computers, a service provider computer/server and a client computer/server at a subscriber-designated remote location. The service provider computer stores electronic employee communications, sorts and keeps track of each subscriber's order. Each remote location of the system has a client server that is hooked up to the Internet and to an electronic display. The client server polls the service provider computer/server on a regular basis and retrieves an updated assortment of employee communications in electronic form, which are then displayed on the electronic display. The electronic display may be configured to also show regularly updated news, weather and sports information, or any other type of information desired by the subscriber.

The client computer/server may also be provided with a web browser configured in display mode for display of the media. The web browser may contain a plurality of channels wherein each of the channels contains an electronic poster or an electronic message.

Another preferred embodiment of the invention involves a method of providing customized employee communications in electronic form to a plurality of remote subscriber locations and comprises the steps of: creating employee communication collections containing several electronic employee communications for each subscriber; posting the employee communication collections on a server connected to the Internet; selectively permitting or excluding subscriber's employees to access to the server and allowing the subscriber to: view one or more of the employee communication collections; alter the content of the one or more employee communication collections by: adding or deleting particular electronic employee communications; modifying the content of one or more electronic employee communications; and/or creating a new electronic employee communication for inclusion in the employee communication collection; delivering the employee communication collection to one or more remote subscriber locations designated by the subscriber; and displaying the employee communication collection on one or more electronic displays designated by the subscriber.

In one advantageous embodiment a system for transmitting and displaying electronic media from a service provider to a subscriber is provided comprising a controller for receiving an electronic media collection, a display, coupled to the controller, displaying the electronic media collection provided by the controller, and a controller storage, for storing the electronic media collection received by the controller. The system further comprises a service provider computer coupled to the controller via a network connection, the service provider computer transmitting the electronic media collection to the controller, a service provider storage coupled to the service provider computer, for storing the electronic media collection transmitted to the controller and a customer computer, coupled to the service provider computer via a network connection for generating the electronic media collection to be transmitted to said controller. The electronic media collection is selected from the group consisting of pre-assembled media content generated and provided by the service provider to the subscriber for selection, modified pre-assembled media content generated by the subscriber, and/or custom generated media content generated for the subscriber. The system is provided such that the subscriber selects from among the electronic media to generate the electronic media collection.

In another advantageous embodiment a system for transmitting and displaying electronic media from a service provider to a subscriber is provided comprising a controller for receiving an electronic media collection, a display, coupled to the controller, displaying the electronic media collection provided by the controller and a service provider computer coupled to the controller via a network connection, the service provider computer transmitting the electronic media collection to the controller. The system further comprises a service provider storage coupled to the service provider computer, for storing the electronic media collection transmitted to the controller and a customer computer having a customer storage and coupled to the service provider computer via a network connection for generating the electronic media collection to be transmitted to the controller. The system is provided such that the electronic media collection includes confidential and/or non-confidential media content, the confidential media content being stored on the customer storage and the non-confidential media content being stored on the service provider storage. The system is further provided such that the electronic media collection includes the non-confidential media content transmitted from the service provider computer to the controller, the electronic media collection also including an address to direct the controller to download the confidential media content from the customer storage.

In still another advantageous embodiment a method for transmitting and displaying electronic media from a service provider to a subscriber is provided comprising coupling a controller via a network connection to a service provider computer and coupling a display to the controller. The method further comprises the steps of coupling a customer computer to the service provider computer via a network connection and generating the electronic media collection to be transmitted to said controller. The electronic media collection is selected from the group consisting of: pre-assembled media content generated and provided by the service provider to the subscriber for selection, modified pre-assembled media content generated by the subscriber; and/or custom generated media content generated for the subscriber. The method still further comprises the steps of storing the generated electronic media collection in a service provider storage accessible by the service provider computer and transmitting the electronic media collection from the service provider computer to the controller. Finally, the method comprises the steps of storing the electronic media collection in a controller storage accessible by the controller and displaying the electronic media collection on the display.

In yet another advantageous embodiment a system for transmitting and displaying electronic media from a service provider to a plurality of subscriber locations is provided comprising at least two controllers for receiving first and second electronic media collections respectively and at least two displays coupled to the at least two controllers respectively, the at least two displays displaying the first and second electronic media collections received by the at least two controllers. The system further comprises at least two controller storages coupled to the at least two controllers respectively, for storing the first and second electronic media collections received by the at least two controllers and a service provider computer coupled to the at least two controllers via a network connection, the service provider computer transmitting the first and second electronic media collections to the at least two controllers. The system still further comprises a service provider storage coupled to the service provider computer, for storing the first and second electronic media collections transmitted to the at least two controllers and a customer computer, coupled to the service provider computer via a network connection for creating the first and second electronic media collections transmitted to the at least two controllers. The system is provided such that the at least two controllers are positioned at different physical locations and the subscriber generates the first and second electronic media collections sent to each of the at least two controllers respectively.

As used in this application, the term "deliver" shall be understood to encompass transmitting, downloading and uploading, or any combination thereof.

The term "network" as used herein includes both networks and internetworks of all kinds, including the Internet, and is not limited to any particular network or inter-network.

The term "media data" as used herein means data distributed on storage media, or otherwise, without regard to the form or content thereof, and including but not limited to audio, video, text, images, animations, web pages and streaming media data.

The terms "coupled", "coupled to", and "coupled with" as used herein each mean a relationship between or among two or more devices, apparatus, files, programs, media, components, networks, systems, subsystems, and/or means, constituting any one or more of (a) a connection, whether direct or through one or more other devices, apparatus, files, programs, media, components, networks, systems, subsystems, or means, (b) a communications relationship, whether direct or through one or more other devices, apparatus, files, programs, media, components, networks, systems, subsystems, or means, and/or (c) a functional relationship in which the operation of any one or more devices, apparatus, files, programs, media, components, networks, systems, subsystems, or means depends, in whole or in part, on the operation of any one or more others thereof.

One objective of the method and system is to provide an apparatus for distribution of electronic media capable of electronically transferring employee communications generated at a provider location to a plurality of remote subscriber locations.

Another objective to provide an apparatus for distribution of electronic media that enables both the provider and the subscriber to easily customize the content of employee communications and increases the variety of materials available for inclusion in employee communications.

A further objective to provide a method for distribution of electronic media in which employee communications are efficiently produced at a provider location, customized by a subscriber and delivered to the subscriber in electronic form for display at remote subscriber locations.

It is still a further objective to provide a system and method in which a subscriber may securely maintain confidential company information on the subscriber's own system to display to employees on a company display, while at the same time variously integrating non-confidential service provider information to the display.

BRIEF DESCRIPTION OF THE DRAWINGS

Other objects and advantages of the present invention will become apparent from the specification and drawings wherein.

DETAILED DESCRIPTION OF THE INVENTION

Referring now to the drawings, wherein like reference numerals designate corresponding structure throughout the views.

Figure 1:
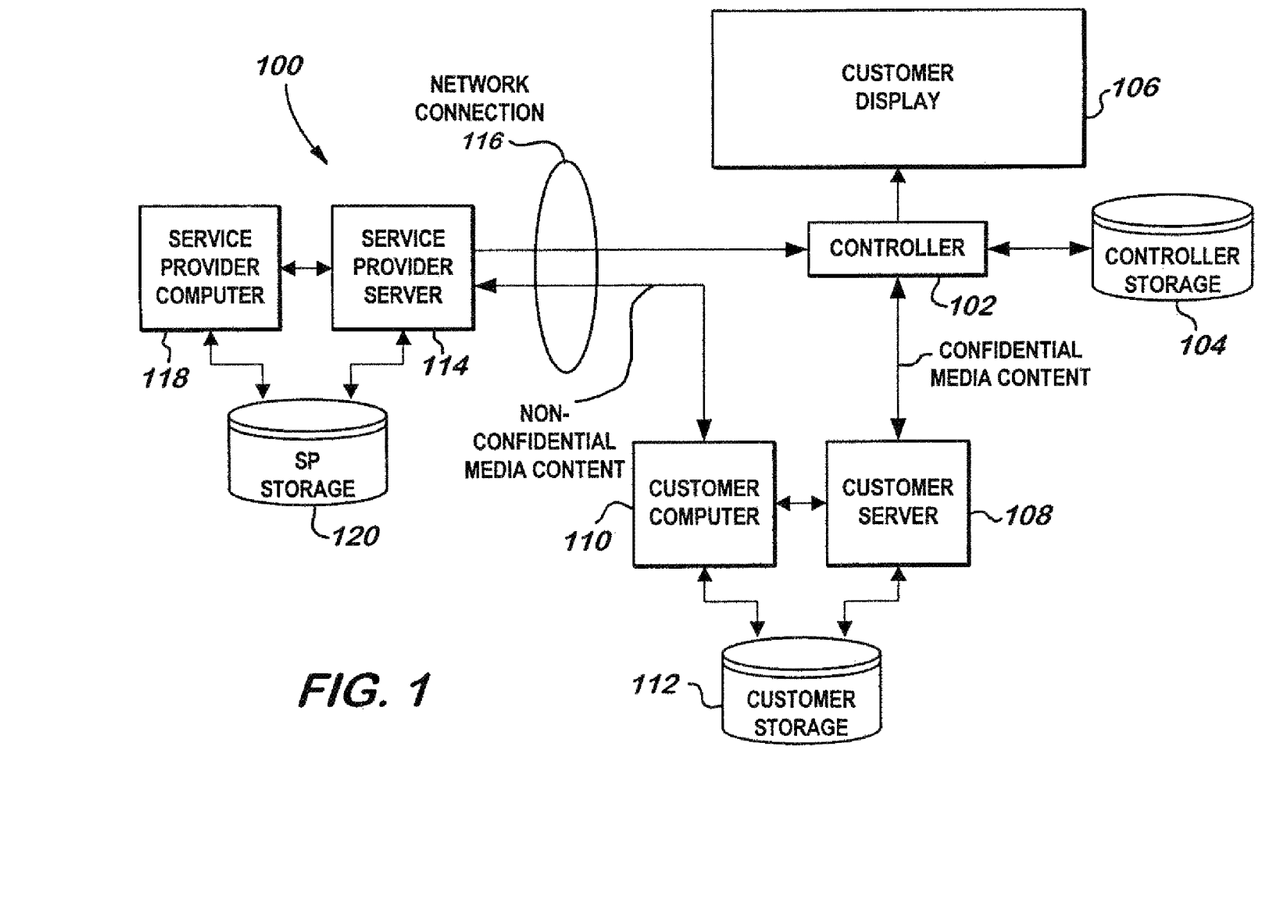
FIG. 1 is a block diagram of one advantageous embodiment of the present invention.

FIG. 1 is a block diagram of one advantageous embodiment of electronic media system 100. Electronic media system 100 is illustrated including a controller 102 having a controller storage 104, the controller 102 coupled to a customer display 106. Also illustrated in FIG. 1 is a customer server 108 and customer computer 110 coupled to a customer storage 112. Additionally, a service provider server 114 is shown variously coupled to controller 102 and to customer computer 110 via a network connection 116. A service provider computer 118 is further illustrated coupled to service provider storage 120 and service provider server 114.

Controller 102 may comprise any type of electronic programmable controller capable of receiving electronic data and transmitting the received data to a video display. In addition, the customer display 104 may comprise virtually any type of video display, however, in a preferred embodiment, customer display 104 comprises 26 inches (66 centimeters) in height and 63 inches (160 centimeters) in width and may comprise a flat panel video display.

The controller 102 is coupled to service provider server 114 via network connection 116. It is contemplated that network connection 114 may be or comprise, for example, any of the following the Internet, an intranet, a LAN (Local Area Network), a WAN (Wide Area Network) or a MAN (Metropolitan Area Network), a frame relay connection, an Advanced Intelligent Network (AIN) connection, a synchronous optical network (SONET) connection, a digital T1, T3 or E1 line, Digital Data Service (DDS) connection, DSL (Digital Subscriber Line) connection, an Ethernet connection, an ATM (Asynchronous Transfer Mode) connection, FDDI (Fiber Distributed Data Interface) or CDDI (Copper Distributed Data Interface) connections.

A subscriber is able to access a variety of media content provided by the service provider to the subscriber. For example, the subscriber is provided with pre-assembled media content generated and provided by the service provider. This pre-assembled media content comprises media information the service provider has assembled and is believed would be of interest to the subscriber. The service provider may, further suggest certain media content to the subscriber, which the subscriber may or may not select for display to its employees. In addition, the service provider may continually update the pre-assembled media content to provide fresh information to the subscriber so as to keep employees interested in the displayed information.

Figure 6:
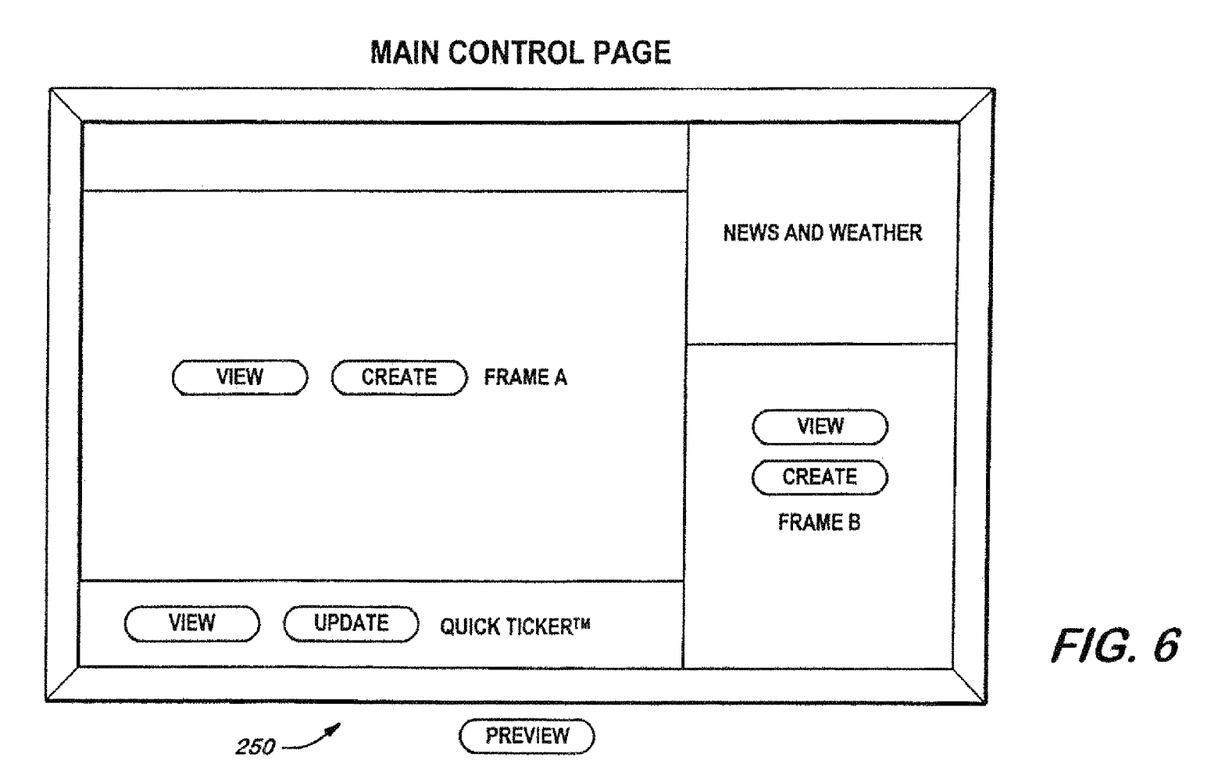
FIG. 6 is a representative screen generated by application software, which a subscriber may use in connection with the apparatus and method of FIGS. 1 and 2.

Also provided for the subscriber is the ability to modify the pre-assembled media content. For example, the subscriber may wish to present some of the pre-assembled media content to its employees with some minor changes particular, for instance, to the site location. The subscriber may select the pre-assembled media content and, by means of editing tools in the system software (e.g. FIG. 6), may modify the pre-assembled media content as desired. This may include, adding new content to the pre-assembled media content, deleting certain media content, rearranging the media content including altering the size, look and feel of the media content, altering the play time or play order for certain media content and so forth.

Still further, the subscriber may wish to generate entirely new media content completely unrelated to any of the pre-assembled media content. Again, the subscriber is provided with the tools to be able to compile virtually any information or data desired to be displayed on customer display 106.

Once the subscriber has viewed, modified and/or generated the media content to be displayed, the subscriber may compile an electronic media collection, which comprises all the information that the subscriber desires to be played on the customer display 106. The subscriber may further assemble the media content to play in a desired play order including selecting the length of time each segment of information will be displayed on the customer display 106.

The electronic media collection may, in one advantageous embodiment, be stored on service provider storage 120. In this manner, a subscriber may access and select certain pre-assembled media content and save an electronic media collection on service provider storage 120. In addition, the subscriber may access and modify certain pre-assembled media content and save the modified content in the electronic media collection. Still further, the subscriber may generate completely new media content, which may also be saved in the electronic media collection on service provider storage 120. However, it is contemplated that the newly generated media content may comprise sensitive confidential information that the subscriber wants to protect as confidential. In this manner, the subscriber may generate the confidential media content on, for example, customer computer 110 and store the confidential media content on customer storage 112 on a secure network. When assembling the electronic media collection, rather than placing the confidential media content on service provider server 114, the customer may simply provide an electronic address, such as a URL, pointing to the location of the confidential media content. In this manner, the electronic media collection is downloaded to controller 102 from service provider server 114 and saved on controller storage 104. When the electronic media collection is run by controller 102, any point in the program where confidential media content is to be played, the controller will be directed to obtain that information at an address on the customer system, for example, controller 102 may be coupled to customer server 108 to access the confidential media content saved on customer storage 112. In this way, the subscriber may generate confidential media content that will be maintained securely on the subscriber private network.

However, it is further contemplated that the subscriber may generate non-confidential information that need not be stored on the customer's system. In this manner, the non-confidential media content may simply be uploaded to service provider server 114 and saved on service provider storage 120 as desired.

The electronic media system 100 therefore, advantageously provides for complete control of the media content to be played on customer display 106. In addition, the system 100 also allows any highly confidential information to be integrated into the electronic media collection while still maintaining the information secure and confidential on the subscriber's own system.

While the subscriber may, at their choice, modify and/or generate their own media content, the subscriber may simply use the pre-assembled media content. The subscriber can set up the system to automatically update the electronic media collection with new pre-assembled media content as such becomes available. Alternatively, the subscriber may set the system up to provide the subscriber with a notification that new pre-assembled media content for the subscriber's review and authorization to play. Still further, the subscriber may set the system up such that the electronic media collection can only be updated manually. As can be seen, a maximum amount of control is provided to the subscriber for generation, modification and display of media content.

In an advantageous embodiment, controller 102 queries service provider server 114 for an electronic media collection to be run on an associated customer display 106. It is contemplated that controller 102 may query service provider server 114 at a period time interval, e.g. every 15 minutes, such that the electronic tool collection is automatically updated. The automatic query function also may provide a diagnostic tool for system 100. For example, if the controller 102 does not query service provider server 114 within a certain time frame, the system 100 may provide an alert to the service provider or the subscriber regarding such. In this manner, the system will not experience significant "down time" as no one is aware the controller 102 is not functioning properly.

Another advantage of the present embodiment is that, since controller 102 downloads the electronic media collection and stores it in controller storage 104, which may or may not be a cache memory location, upon severing of the network connection 116, the controller 102 can continue to play the electronic media collection on customer display 106 until the network connection 116 is re-established.

While FIG. 1 has been discussed in connection with only one customer display 106 location, it is contemplated that the subscriber may have many differing display locations, whether in the same complex or in many differing complexes. The subscriber is given maximum control of the media content provided to the various displays as described above. For example, the subscriber may wish to present certain media content to all maintenance personnel in the various complexes, the subscriber may assemble a media collection and assign the collection to a particular group for display. Alternatively, the subscriber may want to provide different information to a customer display 106 for management personnel. The system 100 allows for the full customization of content, while at the same time, allowing the subscriber to associate collections with particular groups to facilitate ease of directing the media content to the correct customer display 106.

Figure 2:
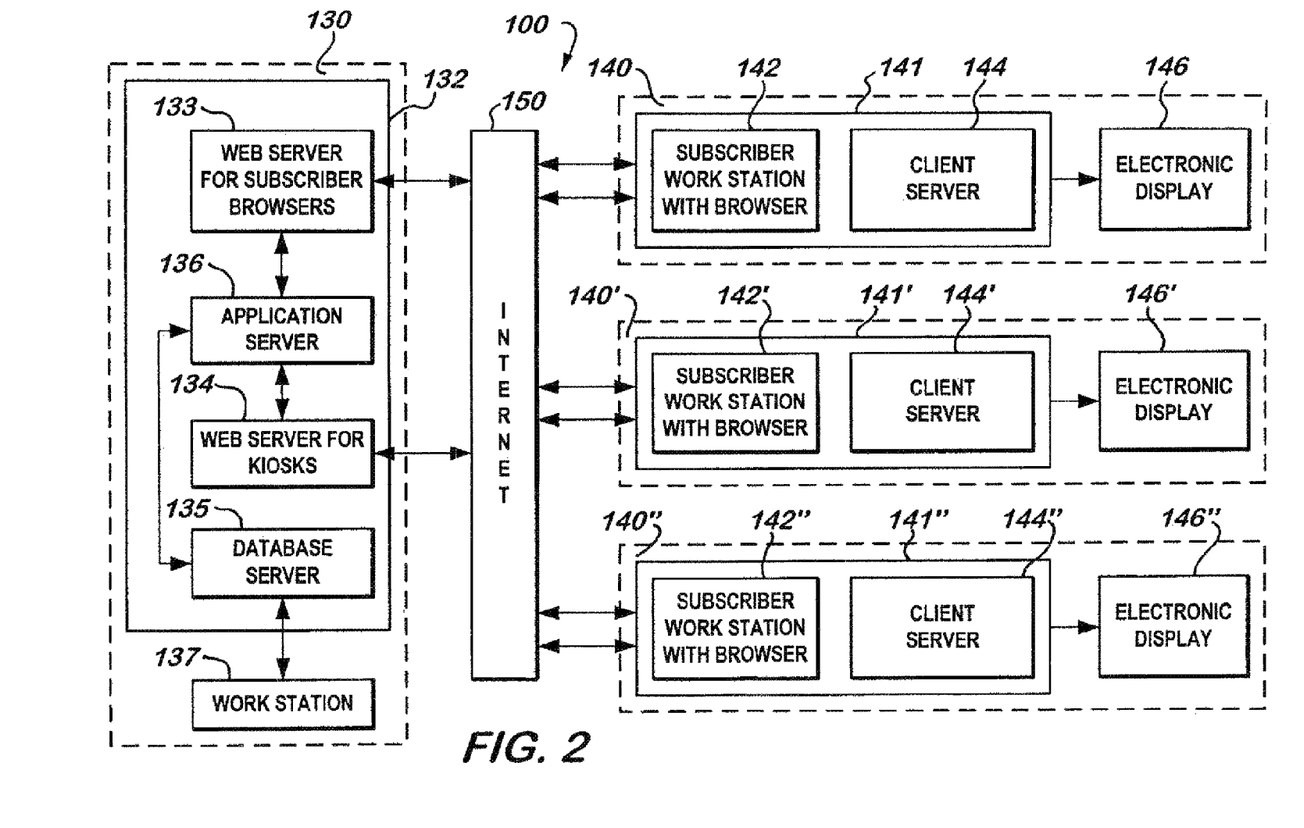
FIG. 2 is block diagram of another advantageous embodiment of the present invention.

Another embodiment of an apparatus for distribution of electronic media according to the present invention is schematically illustrated in FIG. 2 and generally designated by the numeral 100. The apparatus for distribution of electronic media 100 facilitates electronic transmission of employee communications from a primary location to one or more remote subscriber locations. The employee communications may take the form of a "poster" as that term is commonly understood, where the poster is created and maintained in electronic form. A typical electronic poster or media collection may include text and graphics arranged to be visually attractive and convey information pertinent to a subscriber's business, workplace or employees. The subject matter of the employee communications may involve safety, quality, teamwork, morale, self motivation, subscriber news releases, employee activities and the like.

The term "employee communication" as used herein is intended to include all forms of visual communication including graphics, written and printed text along with photographs, visual works and artistic material displayed either alone or in any combination. Particular employee communications may take the form of an electronic media collection or poster as described above and further include video and audio presentations.

The apparatus for distribution of electronic media 100 comprises a main server system 130 located at a primary location and a multiplicity of client or subscriber communication and display systems 140, 140', 140" located at each remote subscriber location. The subscriber communication and display systems 140, 140', 140" communicate with the main server system 130 via, for example, an Internet connection 150, or other suitable communications pathway.

The main server system 130 comprises a computer 132 configured to function as a first web server 133, a second web server 134, a data base server 135, and an application server 136. While the main server system 130 is described in terms of several services and server functions, a single computer 132 may be configured to provide all functions and incorporate all described services. The computer 132 may be any commercially available server such as those manufactured and marketed by the Compaq Corporation or may be or include, for instance, any personal computer running the Microsoft Windows® 95, 98, 2000 or later version, Millenium®, NT®, Windows CE®, Palm® OS, Unix®, Linux®, Solaris®, OS/2®, BeOS®, MacOS® or other operating system or platform. Computer 132 may also be or include any microprocessor-based machine such as an Intel® x86-based device or Motorola 68K or PowerPC device, microcontroller or other general or special purpose device operating under programmed control. In addition, computer 132 may be connected to the Internet connection 150 in a well-known manner. The first web server 133 is configured to be accessible by one or more subscriber work stations 142, 142', 142" to allow subscribers to modify the content of the employee communications.

The second web server 134 may be similar to web server 133 although modified to communicate via with one or more client servers 144, 144', 144". It will be understood that while two web servers 133 and 134 are provided, one web server performing both functions may be employed instead.

The database server 135 may be used to store subscriber information such as subscriber identification, business type, routing information and media data such as employee communication collections developed at a workstation 137 and as modified by the application server 136 as discussed below. Numerous workstations 137 may be employed. Each workstation 137 is configured so that a graphic designer may develop electronic employee communications (which may take the form of electronic media collections) and collect them together into employee communication collections which may contain, for example, collections of media collections and messages for a particular subscriber. The employee communications are created at the workstation 137, using software such as, for example but not limited to, Adobe Photoshop™ or Adobe Illustrator™. The electronic employee communications are then sent to application server 136 where they are organized by edition and subscriber. The work station 137 communicates with the data base server 135 to transmit various electronic employee communications, etc., which are developed at the work station 137 in a conventional manner. The electronic employee communications are converted into an appropriate format for transmission over the Internet connection 150, such as file transfer protocol (FTP), and then stored before transfer to a client communication and display system 140, 140', 140".

The application server 136 communicates with both the first and second web servers 133, 134 and with the data base server 135. The application server 136 provides coordination between the web servers 133 and 134 and allows access to the electronic media collections contained in data base server 135. The application server 136 includes application software that tracks and distributes content according to subscriber data and as modified by subscribers according to the method of the present invention.

The client communication and display system 140, 140', 140" comprises a computer 141, 141', 141" respectively, that may include a client workstation 142, 142', 142", a client server 144, 144', 144", and an electronic display 146, 146', 146". The client workstation 142, 142', 142" communicates with the web server 133 via the Internet connection 150. The client workstation 142, 142', 142" preferably comprises a web browser sold under the trademark EXPLORER by the Microsoft Corporation of Redman, Wash. Optionally, other web browsers, such as that sold under the trademark NETSCAPE by the Netscape Communications Corporation of Mountain View, Calif., may be employed. The client work station 142, 142', 142" interactively communicates with web server 133 to transmit subscriber input, for example, to modify an employee communication collection and receive an updated version of the employee communication collection.

The electronic display 146, 146', 146" may be any suitably large electronic display but is preferably a large flat panel gas plasma display, such as those manufactured and sold by the Sony corporation of Japan.

The client server 144, 144', 144" receives employee communication collections (alternatively referred to as electronic media collections) in the form of data in a particular format, for display on the electronic display 146, 146', 146". It will be appreciated that the computer 141, 141', 141" may be located on a housing supporting the electronic display 146, 146', 146", but is preferably separated some distance therefrom. In any event, the client server 144, 144', 144" communicates with the web server 133 via the Internet connection 150. The client server 144, 144', 144" preferably comprises a web browser, which may be configured in a display mode whereby the browser receives data from the web server 133 and generates a continuous display. In particular, it will be understood that a number of channels of the web browser may be used to simultaneously display various elements of the employee communications collection for varying amounts of time.

Figure 5:
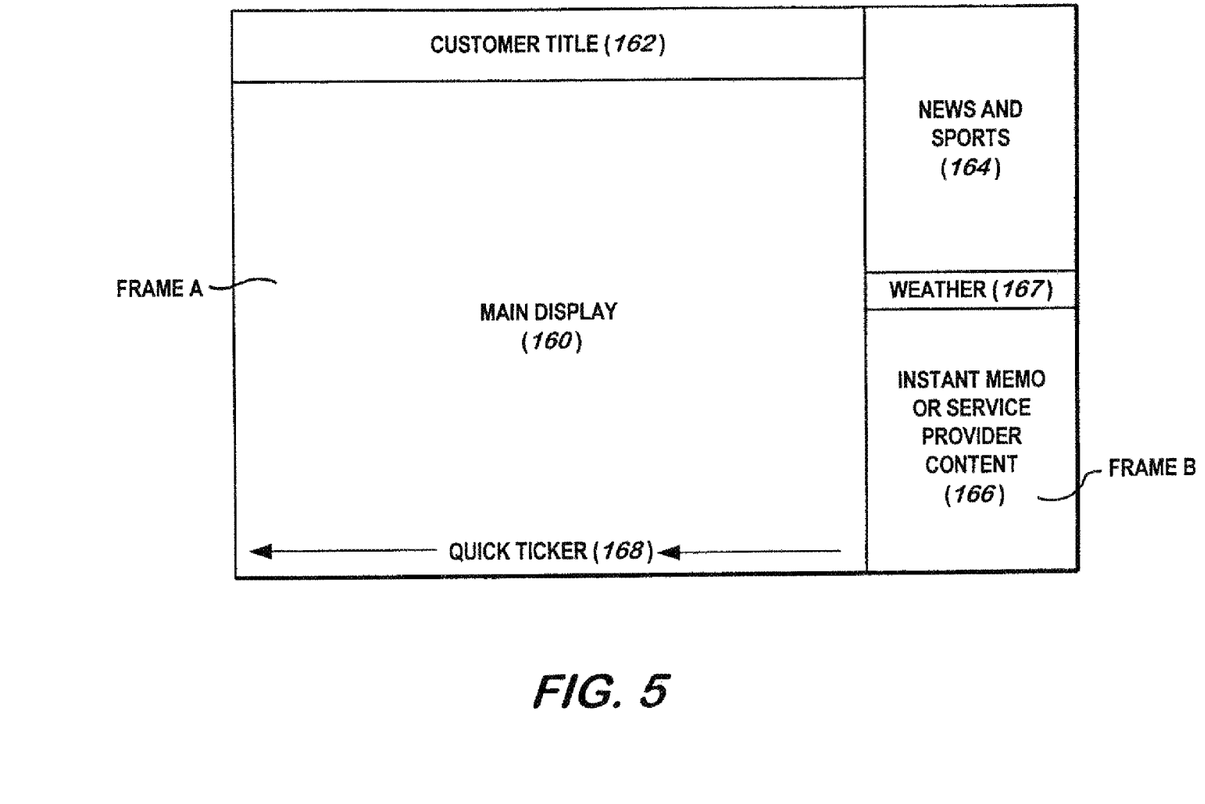
FIG. 5 is an annotated diagram of a representative electronic display according to FIGS. 1 and 2.

The client server 144, 144', 144" communicates employee communication collections (electronic media collections) to the electronic display 146, 146', 146" for display. Preferably, the electronic display 146, 146', 146" may comprise a plurality of sections for displaying different materials (FIG. 5). For example, as seen in FIG. 5, four separate sections 160, 162, 164 and 168 may be provided—each of which may be functioning simultaneously and at different update times and periods. Each section may sequentially display varying messages and/or visual media content, slogans, etc. For example, in section 160 (Frame A) audio/visual electronic media content may be played or shown for a specified time period, e.g. fifteen (15) minutes, and then switch to custom executive media content. Section 166 (Frame B) may display, concurrently with the employee communications displayed on section 160, an employee communication, then switch to Good Will Motivator™ media content and thereafter switch, for example, to a management suggested letter. The relative timing may also be selected. For example, the messages may alternate every fifteen (15) minutes and may start seven and one half (7.5) minutes after the electronic media content is initially displayed in section 160. Section 164 may display news or announcements such as news headlines, sports scores and may be additionally split into a subsection 167 for display of local current and/or 3 or 5-day weather forecasts. The electronic display 146, 146', 146" may include media such as a client's name or trademark, etc. as illustrated at 162, which may be permanently affixed thereto.

Operation.

Figure 3:
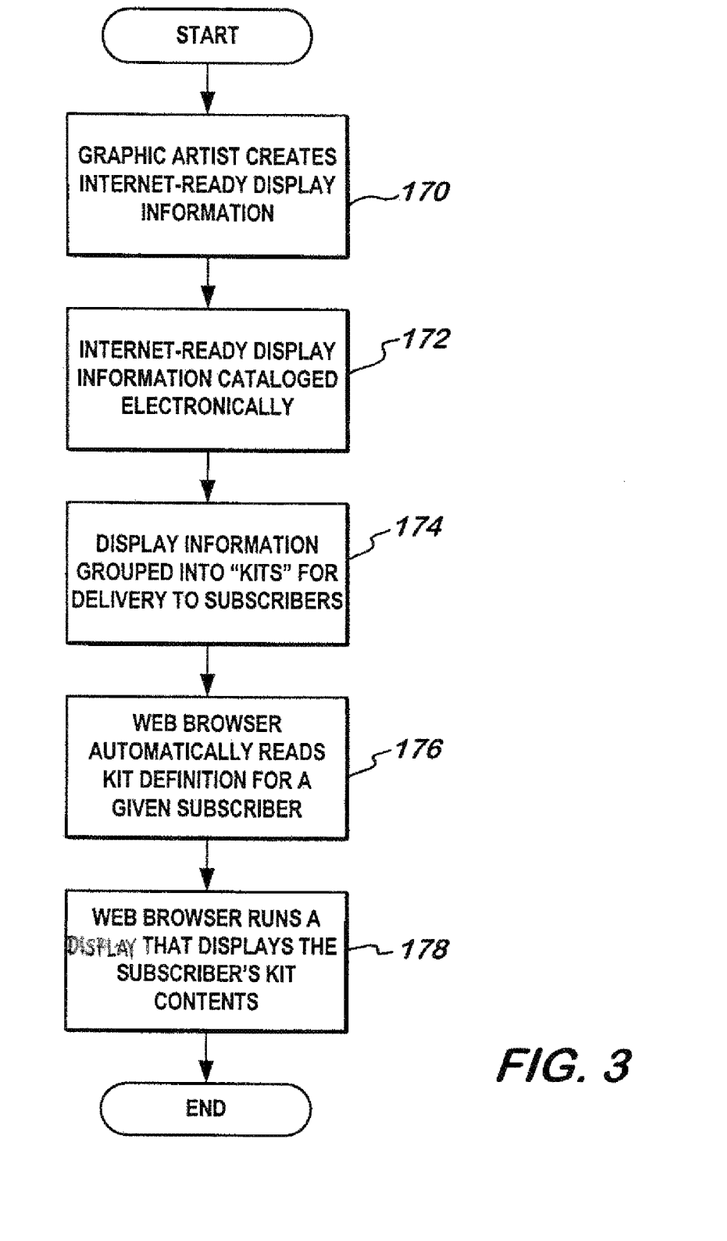
FIG. 3 is a partial flow diagram for a method of distributing electronic media according to the systems of FIG. 2.
Figure 4:
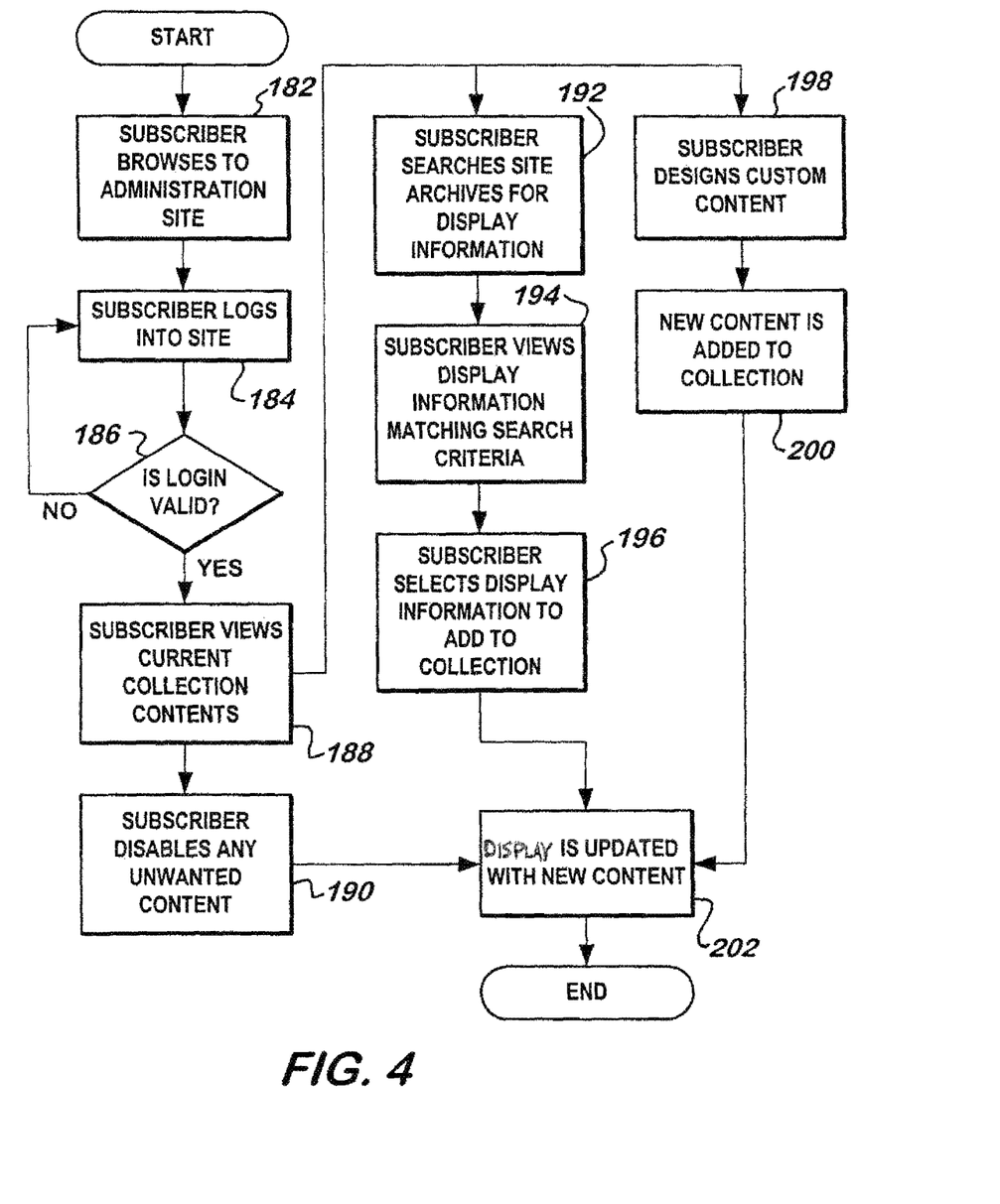
FIG. 4 is a partial flow diagram for a method of distributing electronic media according to the systems of FIGS. 1 and 2.

With reference to FIGS. 2, 3 and 4, a graphic artist using work station 137 creates an employee communication in electronic form that is compiled into an employee communications collection in a data format, as discussed above, that is suitable for transmission over the Internet as shown at 170 (FIG. 3). The electronic employee communications are cataloged and stored in the data base server 135 at 172 (FIG. 3).

The application server 136 and workstation 137 function to group electronic employee communications by topic and edition. The electronic employee communications may also be compiled into employee communications collections arranged by, for example, a particular subscriber or subscriber type such as retail or manufacturing subscribers at 174 (FIG. 3.) For example, the subscribers of systems 140 and 140' may have access only to one set of electronic media collections while the subscriber of system 140" has access only to a different set of electronic media collections. The application server 136 is also configured to indicate the last time and date that revisions or updates have been made to the employee communication collections.

Each subscriber may modify these collections using a subscriber workstation 142, 142', 142". The subscriber may select specific electronic employee communications (electronic media content) for display on the electronic display 146, 146', 146". Thereafter, the client server 144, 144', 144" communicates the electronic employee communications to the electronic display 146, 146', 146" at 176 (FIG. 3), as described above, for display at 178 (FIG. 3.) The subscriber can query through the web browser to determine the latest times and dates of electronic media collection changes.

The subscriber may also modify the contents of an employee communication collection as follows. Using a subscriber workstation 142, 142', 142", the subscriber contacts the web server 133 (see, 182 and 184 of FIG. 4) and logs onto the web server 133. After checking for proper password and client ID at 186, the subscriber is allowed to view the current employee communication collection contents at 188. The subscriber may then choose between different options. The subscriber may search for electronic employee communications by topic, for example, electronic media content with themes such as safety, attitude, cooperation, etc. The subscriber may further remove any unwanted visual electronic media content or other content at 190. The subscriber may also search, using the application server 136, to select particular electronic media content or display information and add the selected media content to the employee communications collection at 192, 194 and 196. The subscriber may have access to various screens such as screen 250 (FIG. 6) to facilitate the search and selection. Optionally, the subscriber may design its own electronic media content within the application or simply provide electronic material for display, all of which may be added to the employee communications collection at 198 and 200. Once a subscriber has completed the modification, the application server 136 makes the updated employee communications collection available. Accordingly, when the client server 144, 144', 144" polls the web server 133, new media data is downloaded for display on the electronic display 146, 146', 146" as shown at 202 (FIG. 4.)

While the present invention has been described in connection with what are presently considered to be the most practical and preferred embodiments, it is to be understood that the present invention is not limited to the disclosed embodiments. Rather it is intended to cover all of the various modifications and equivalent arrangements including within the spirit and scope of the appended claims.

What is claimed is:

1. A system for transmitting and displaying electronic media comprising:
    a controller for receiving an electronic media collection;
    a display, coupled to said controller, displaying the electronic media collection provided by said controller;
    a service provider computer coupled to said controller via a network connection to periodically update said controller;
    a customer computer having a customer storage and coupled to said controller for generating the electronic media collection transmitted to said controller;
    said electronic media collection including media content stored on said customer storage and selected from the group consisting of:
        pre-assembled media content generated and provided by the service provider computer to the customer computer;
        modified pre-assembled media content generated by the customer computer; and/or
        custom generated media content generated for the customer computer;
    wherein electronic media content is selected by said customer computer to generate said electronic media collection for presentation on said display.

2. The system according to claim 1 wherein the pre-assembled media content is periodically updated.

3. The system according to claim 1 wherein said display comprises at least a first and a second frame.

4. The system according to claim 3 wherein the first frame is displays media data selected from the group consisting of: audio, video, text, images, animations, web pages, streaming media data and combinations thereof.

5. The system according to claim 4 wherein subscriber sets a sequential order and time limit for each media data to be displayed on said display.

6. The system according to claim 3 wherein said display further comprises a section for display of a subscriber title.

7. The system according to claim 3 wherein said display further comprises a moving ticker message that scrolls across at least a portion of the first frame.

8. The system according to claim 7 wherein the moving ticker is customized by the subscriber.

9. The system according to claim 3 wherein said second frame further comprises a third portion displaying weather information.

10. The system according to claim 1 wherein said display comprises at least two displays.

11. A system for transmitting and displaying electronic media from a service provider to a subscriber comprising:
    a controller having a controller storage;

a display coupled to said controller, said display displaying an electronic media collection, said display including at least a first and a second frame where the first frame displays media data selected from the group consisting of: audio, video, text, images, animations, web pages, streaming media data and combinations thereof and a sequential order for each media data to be displayed on said display is selectable;

a service provider computer coupled to said controller via a network connection;

a customer computer, coupled to said service provider computer via a network connection;

said electronic media collection selected from the group consisting of:

pre-assembled media content generated and provided by the service provider computer to the customer computer; and/or modified pre-assembled media content generated by the customer computer; and/or custom generated media content generated for the customer computer wherein electronic media content is selected by said customer computer to generate said electronic media collection for presentation on said display.

12. The system according to claim 11 wherein the storage on said controller comprises cache memory location.

13. The system according to claim 11 wherein when the electronic media collection comprises custom generated media content generated for the subscriber, the custom generated media content is categorized as confidential and non-confidential content, wherein the confidential content is maintained on the customer computer for delivery to said controller and the non-confidential content is maintained on the service provider computer for delivery to said controller.

14. The system according to claim 11 wherein said display further comprises a moving ticker message that scrolls across at least a portion of the first frame.

15. The system according to claim 14 wherein the moving ticker is customizable by the subscriber.

16. The system according to claim 11 wherein the second frame is divided into a first portion and a second portion;

said first portion receiving pre-assembled media content; and said second portion receiving:
pre-assembled media content; and/or
modified pre-assembled media content; and/or
custom generated media content.

17. The system according to claim 11 wherein said second frame further comprises a third portion displaying weather information.

18. The system according to claim 11 wherein the first and second frames comprise a graphical interface for selection of media content to be displayed in each frame.

19. The system according to claim 11 wherein said electronic media collection is saved on said controller storage.

20. The system according to claim 19 wherein said controller periodically queries said service provider computer to determine if an updated electronic media collection is available and if so, said controller downloads the updated electronic media collection.

* * * * *